Dec. 9, 1947. J. A. MULLER 2,432,170
FLUID OPERATED CONTROL CIRCUIT FOR HYDRAULIC SYSTEMS
Filed Feb. 26, 1943 3 Sheets-Sheet 3
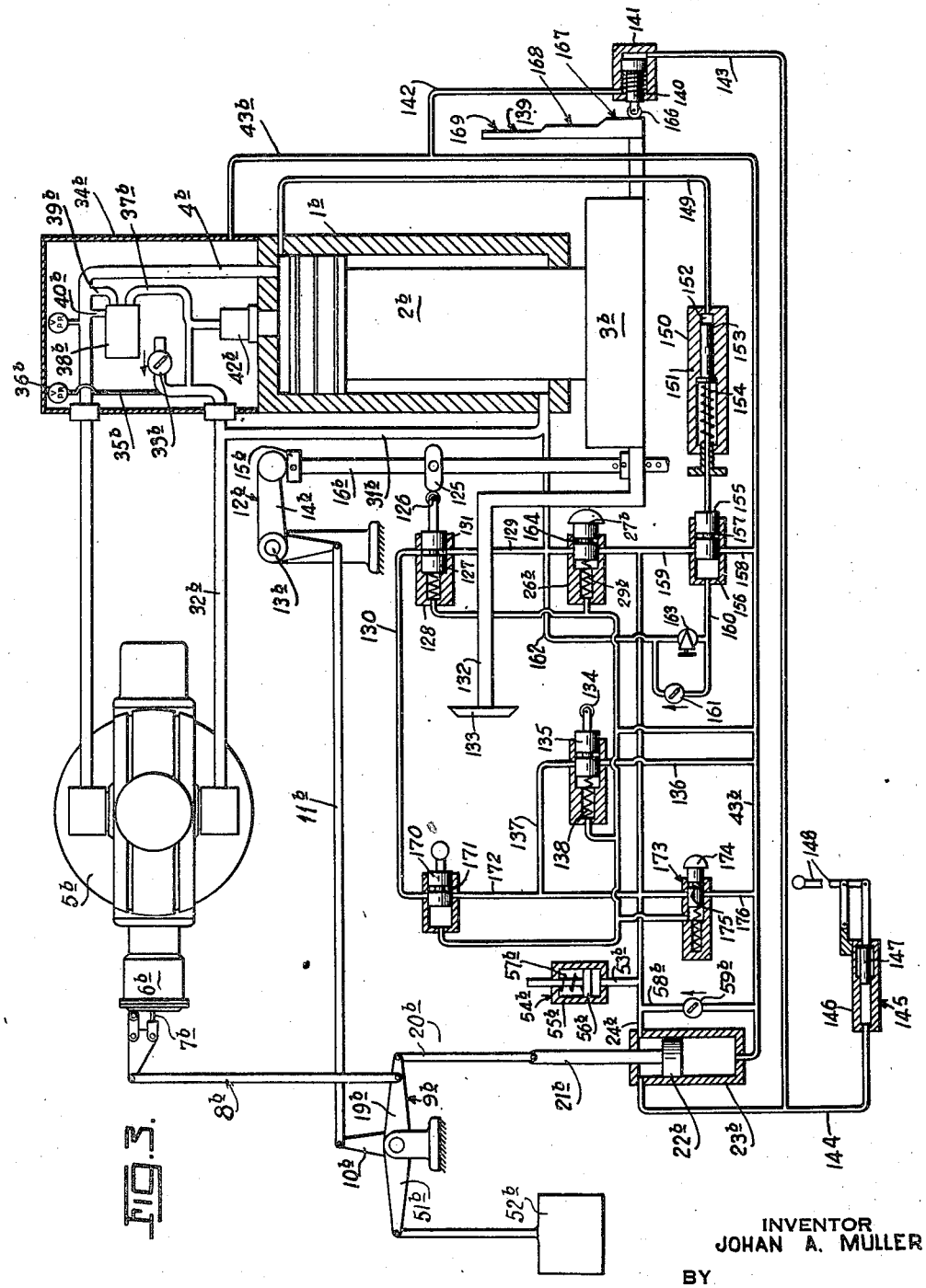
INVENTOR
JOHAN A. MULLER
BY
Toulmin & Toulmin
ATTORNEY Patented Dec. 9, 1947

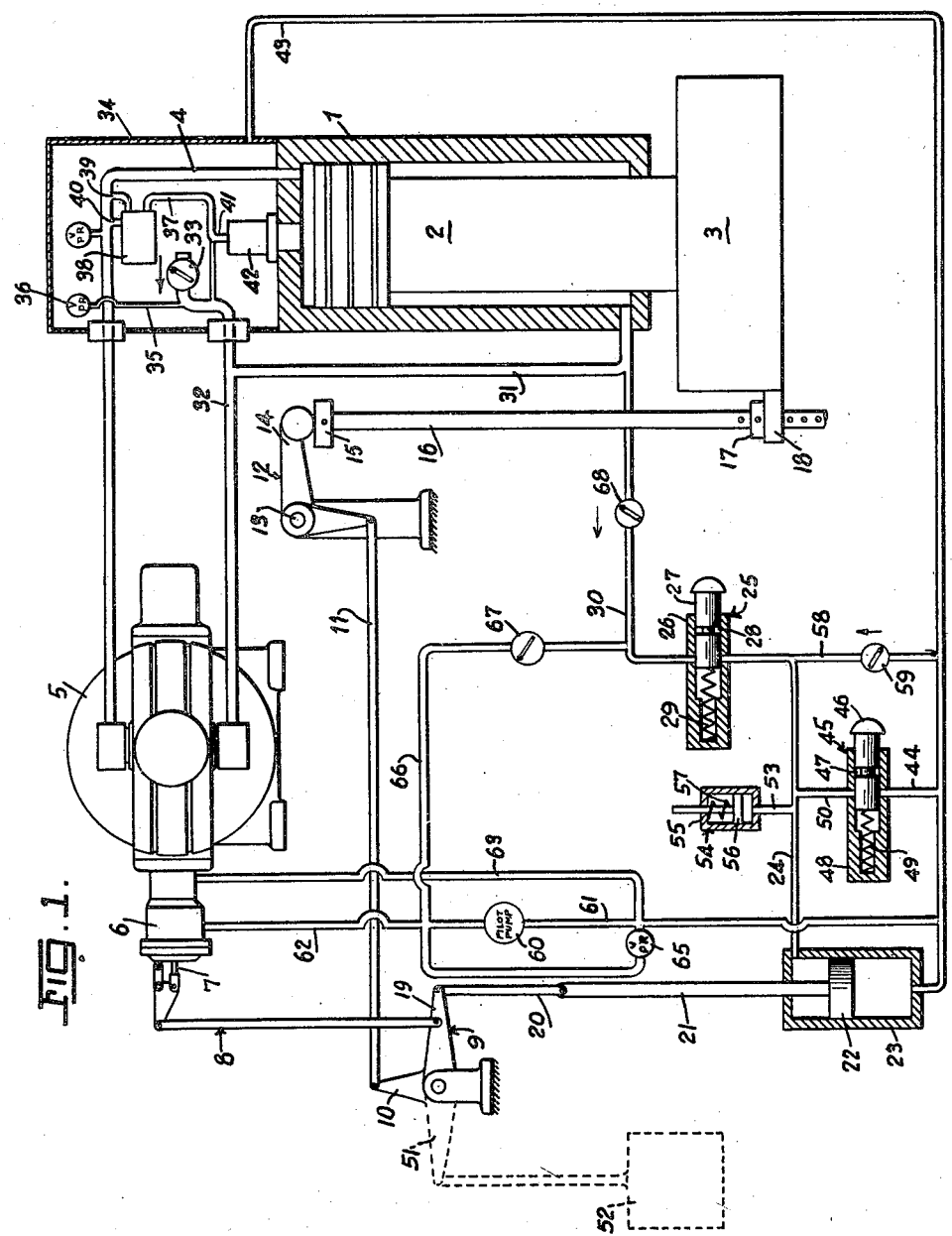

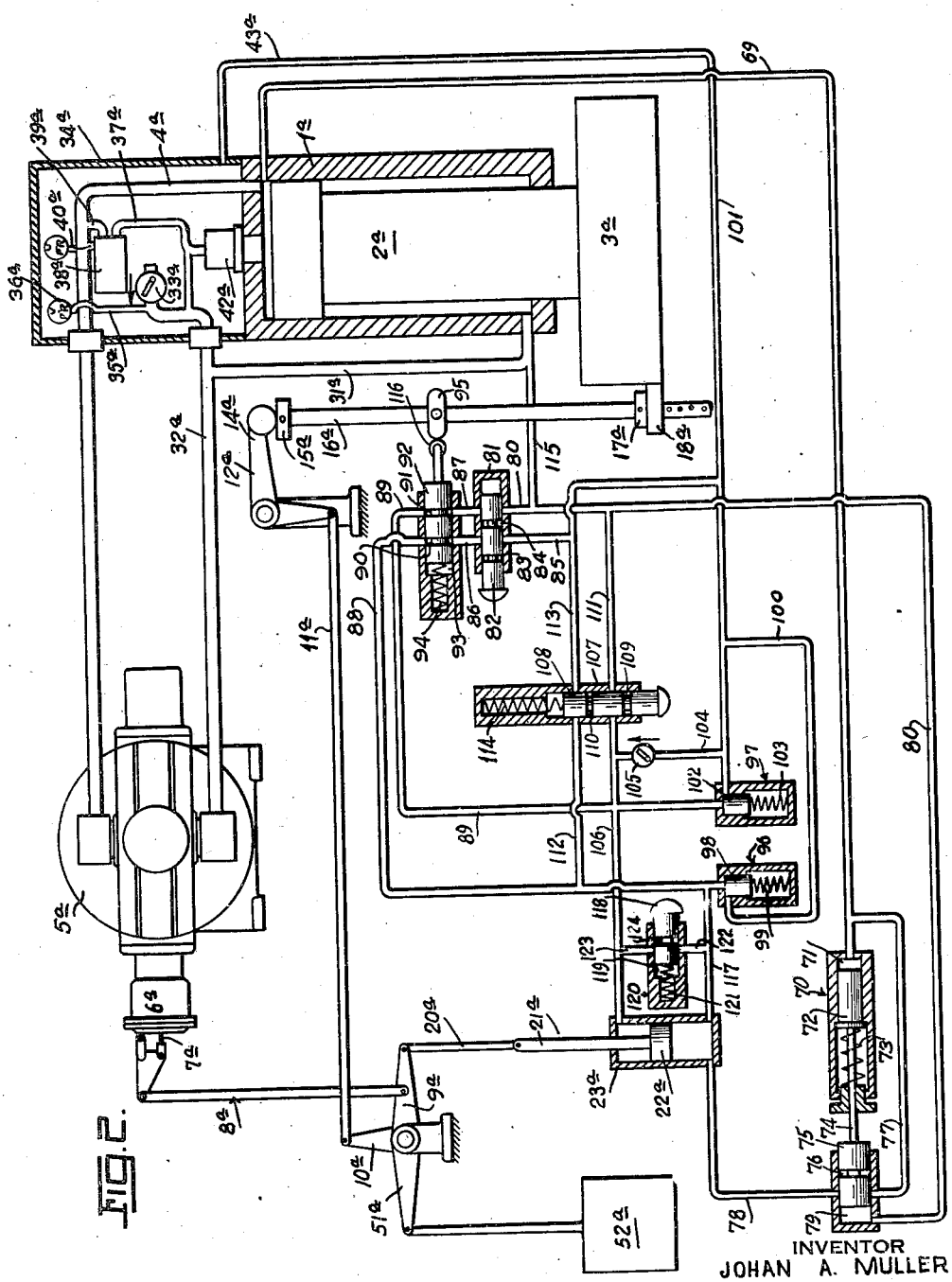

UNITED STATES PATENT OFFICE 2,432,170

FLUID OPERATED CONTROL CIRCUIT FOR HYDRAULIC SYSTEMS

Johan A. Muller, Dayton, Ohio, assignor to The Hydraulic Development Corporation, Inc., Wilmington, Del., a corporation of Delaware Application February 26, 1943, Serial No. 477,235

8 Claims. (Cl. 60—52)

This invention relates to control systems and, in particular, to hydraulic press control systems. In hydraulic press systems hereinbefore known, it was customary to provide a solenoid for controlling servomotor means associated with a variable delivery pump which latter supplies pressure fluid to the press ram. The said servomotor was controlled in its turn by hydro-electric means.

It is an object of the present invention to provide a control circuit, particularly for presses, which is free from any electric control means.

It is another object to provide a control system for hydraulic presses, in which the hereinbefore customary solenoid for actuating servomotor means pertaining to a variable delivery pump is replaced by hydraulic means.

It is a further object to provide a control system for hydraulic motor means including a reciprocable plunger, in which the delivery of pressure fluid to said motor for actuating the same is hydraulically controlled.

Still another object of the invention consists in the provision of a control system as set forth in the preceding paragraph, in which the reversal of the reciprocable plunger may be hydraulically controlled in response to a predetermined pressure acting on said plunger.

It is a further object of the invention to provide a control system for hydraulic motor means including a reciprocable plunger, in which the reversal of the plunger is controlled hydro-mechanically in response to a predetermined position of the said plunger.

These and other objects and advantages will appear more clearly from the following specification in connection with the accompanying drawings in which:

Figure 1 shows a simplified control system according to the invention.

Figure 2 diagrammatically illustrates a more elaborate control system according to the invention.

Figure 3 illustrates an improvement over the system shown in Figure 2.

Referring now to the drawings in detail, and Figure 1 thereof in particular, the system shown therein comprises a cylinder 1 having reciprocably mounted therein a ram 2 which latter is connected to a press platen 3. The cylinder 1 has connected to the upper portion thereof one end of a conduit 4 the other end of which leads to one side of a variable delivery pump. The pump 5 is a reversible pump and may be of any standard design, for instance, of the type disclosed in Patent No. 2,184,665 to Ernst.

The pump 5 has associated therewith servomotor means 6 including yielding means for continuously urging the pump into full retraction stroke position. The servomotor 6 comprises a control rod 7 which is connected through a linkage system generally indicated 8 with a lever 9 having one arm 10 thereof pivotally connected through a link 11 with a bell crank lever 12. This lever 12 which is pivotally mounted at 13 has one arm 14 adapted to be engaged by a collar 15 adjustably mounted on a control rod 16. The control rod 16, which is guided by guiding means not shown in the drawing, has adjustably connected thereto a collar 17 adapted to be engaged by an arm 18 of the platen 3.

The lever 9 also comprises an arm 19 to which the linkage 8 is pivotally connected. The arm 19 is furthermore pivotally connected by means of the link 20 with the connecting rod 21 forming a part of the plunger 22. The plunger 22 is reciprocably mounted in a control cylinder 23, the upper end of which has connected thereto a conduit 24. The conduit 24 leads to a forward starter valve 25 which comprises a cylinder 26, a valve member 27 with an annular groove 28 and a spring 29 continuously urging the valve member 27 toward the right so as to interrupt fluid connection between the conduit 24 and a conduit 30 which latter leads into a conduit 31.

One end of the conduit 31 is connected with the lower end of the cylinder 1 while the upper end of the conduit 31 leads into a conduit 32. The conduit 32 is connected to one side of the pump 5 and comprises a check valve 33 adapted to allow flow of fluid from the fluid tank or reservoir 34 into the conduit 32 while preventing the flow of fluid in the opposite direction.

Branching off from the conduit 32 is a conduit 35 comprising a pressure relief valve 36 to guard against excessive pressure in the conduit 32. Also branching off from the conduit 32 is a pilot line 37 leading to a main cylinder and pump by-pass valve 38. The valve 38 may be of the type disclosed in Patent No. 2,268,205 to Ernst, and has the purpose of facilitating the initiation of the retraction stroke of the ram 2. The valve 38 is connected through two conduits 39 and 40 with the conduit 4. Connected with the pilot line 37 is a line 41 leading to the surge valve 42 mounted on top of the cylinder 1. The surge valve 42 may be of any standard design, for instance, of the type disclosed in Patent No. 2,193,248 to Ernst. The purpose of this surge valve consists in pre-filling the upper portion of the press cylinder 1 when the latter moves downwardly by gravity during the first portion of its downward stroke.

Connected to the tank 34 is a conduit 43 leading to the lower portion of the control cylinder 23. Branching off from the conduit 43 is a conduit 44 leading to a starter valve 45 for starting the retraction stroke of the ram 2. This valve 45 corresponds in its construction to the valve 25 and comprises a valve member 46 with an annular groove 47, a cylinder 48, in which the valve member 46 is reciprocably mounted, and a spring 49 for continuously urging the valve member 46 into position for interrupting fluid connection between the conduit 44 and the conduit 50 which latter leads to the conduit 24.

Although not necessary, the lever 9 may be provided with an additional arm 51 which, in its turn, may have pivotally connected thereto a weight 52 which continuously urges the lever 9 to rotate in anti-clockwise direction.

The conduit 24 is also connected through a conduit 53 with a small accumulator generally designated 54 and comprising a cylinder 55 with a plunger 56 reciprocably mounted therein. The plunger 56 is continuously urged downwardly by means of a spring 57. Also connected with the conduit 24 is a conduit 58 comprising a check valve 59 and leading to the conduit 43.

The device so far described operates as follows:

It may be assumed that all parts occupy the position shown in Figure 1 and that it is now desired to cause the ram 2 to perform a complete cycle. To this end, the operator starts the pump 5 and furthermore moves the valve member 27 inwardly so that fluid connection is established between the conduit 24 and the conduit 30. As a result thereof, pressure fluid in the lower portion of the press cylinder 1 passes through conduits 30 and 24 into the upper portion of the control cylinder 23 where it acts upon the plunger 22 and moves the same downwardly. The fluid expelled from the lower portion of the cylinder 23, during the downward movement of the plunger 22, escapes through conduit 43 into the tank 34.

As a result of the downward movement of the plunger 22, the lever 9 is moved in clockwise direction so that the linkage 8 moves the control rod 7 inwardly. The pump 5 is then moved into full stroke forward delivery position so that pressure fluid now flows from the pump 5 through conduit 4 into the upper portion of the cylinder 1 where it acts upon the ram 2. Simultaneously, fluid is withdrawn by the pump 5 from the lower portion of the cylinder 1. However, sufficient back pressure still prevails in the conduit 31 and therefore in the conduit 24 and upper portion of the control cylinder 23 to hold the plunger 22 in its downward position.

The ram 2 therefore moves downwardly as fast as fluid is withdrawn from the lower portion of the cylinder 1, while the fluid delivered by the pump 5 into the upper portion of the cylinder 1 is supplemented by fluid passing from the tank 34 through the surge valve 42 which is open at this time. As soon as the ram 2 begins to move downwardly, the operator releases the valve member 27 so that the latter returns to the position shown in Figure 1 in view of the spring 29.

When the press platen 3 engages the work piece, pressure begins to build up in the upper portion of the cylinder 1 thereby causing the surge valve 42 to close. Since, on the other hand, the fluid connection between the conduits 24 and 30 is now interrupted, the plunger 22 cannot return to its starting position. The press ram 2 now performs the actual pressing stroke.

When the pressing stroke has been completed and it is desired to initiate the retraction stroke of the ram, the operator actuates the valve member 46 so as to bring about fluid connection between the conduits 44 and 50 through the annular groove 47 of the valve member 46. As a result thereof, the yielding means or spring in the servomotor 6, and, if the lever 9 has connected thereto the weight 52, also the weight 52 moves the lever 9 in anti-clockwise direction, thereby moving the plunger 22 upwardly. The fluid expelled from the control cylinder 23 during this upward movement of the plunger 22 escapes through conduits 24, 50, 44 and 43 into the tank 34.

Due to the anti-clockwise movement of the lever 9, the control rod 7 is moved outwardly thereby placing the pump 5 in full delivery retraction stroke position. Pressure fluid is now delivered by the pump 5 into the conduit 32 while the conduit 4 becomes the suction line. The pressure in the conduit 32 causes the main cylinder relief and pump by-pass valve 38 to release pressure from the upper portion of the cylinder 1, and also to open the surge valve 42 to establish fluid connection through the latter between the tank 34 and the upper portion of the cylinder 1. The pressure fluid passes from conduit 32 through conduit 31 into the lower portion of the cylinder 1 where it acts upon the ram 2 and causes the latter to move upwardly. The fluid expelled during this upward movement of the ram 2 is in part conveyed through conduit 4 to the suction side of the pump 5 and in part expelled into the tank 34.

As soon as the ram 2 has started its retraction stroke, the operator releases the valve 46 so that the latter is returned into its Figure 1 position by the spring 49. When the ram 2 approaches the end of its retraction stroke, the arm 18 engages the collar 17 connected to the rod 16 and causes the latter, by means of the collar 15 to move the lever arm 14 in anti-clockwise direction. Due to the linkage connection between the bell crank lever 12 and the lever 9, the movement of the bell crank lever 12 in anti-clockwise direction results in a movement of the lever 9 in clockwise direction.

Consequently, the control rod 7 moves slightly inwardly thereby placing the pump 5 in substantially neutral or no delivery position so that no more fluid is delivered to or withdrawn from the cylinder 1, and the press ram 2 comes to a halt.

It will be clear that during the last mentioned movement of the lever 9 in clockwise direction, the plunger 22 moves downwardly into the position shown in Figure 1. During this downward movement fluid is expelled from the lower portion of the control cylinder 23 through conduit 43 in part into the tank 34 and in part through check valves 59 and conduits 58 and 24 into the upper portion of the cylinder 23. All parts now again occupy the position shown in Figure 1 and a new pressing cycle may be started in the manner just described.

If it should happen that during a longer period of idleness the ram 2 begins to drop, also the control rod 16 will drop. This will enable the yielding means in the servomotor means 6, and if the weight 52 is provided, will also cause the latter to shift the lever 9 in anti-clockwise direction. As a result thereof, the pump 5 will again be placed on retraction stroke so that pressure fluid delivered by the pump 5 will return the ram 2 to its starting position shown in the drawing. During the last mentioned anti-clockwise movement of the lever 9, the plunger 22 moves upwardly expelling fluid through conduit 24 and conduit 53 into the accumulator 54, while fluid passes from tank 34 through conduit 43 into the lower portion of the cylinder 23.

In some instances, no back pressure may prevail in the cylinder 1, for instance, if the ram 2 moves horizontally. In this instance, the fluid source 60, which may be a constant delivery pump, and which constitutes standard equipment in connection with the pump 5 for supplying pressure fluid to the servomotor means 6 may be made use of for starting the working stroke of the ram 2. To this end, the fluid source 60 has its suction side connected through a conduit 61 with the conduit 43 while the pressure side of the fluid source 60 is connected through a conduit 62 with the servomotor means 6.

Branching off from the conduit 61 is a conduit 63 likewise leading to the servomotor means 6. A further conduit 64 branching off from the conduit 62 comprises a pressure relief valve 65 which latter is connected to the conduit 61. Also branching off from the conduit 62 is a conduit 66 comprising a check valve 67 and communicating with the conduit 30 which latter is provided with a check valve 68.

With the above arrangement, the advancing stroke of the ram 2 will be initiated as follows:

It may be assumed that the pump 5 has been started and that the fluid source 60 is delivering pressure fluid into the conduit 62. To start an advancing stroke of the ram 2, the operator moves the valve member 27 inwardly so as to establish fluid connection between the conduits 30 and 24. Pressure fluid from the fluid source 60 will then pass through conduits 66, 30 and 24 into the upper portion of the control cylinder 23 to thereby move the plunger 22 downwardly. This will result in the movement of the pump 5 into full delivery forward stroke position as described above so that the ram 2 begins its advancing stroke. The remainder of the cycle will be exactly as described before.

Referring now to Figure 2, the arrangement shown therein uses the principal disclosed in connection with Figure 1. Similar parts are therefore indicated with the same numerals as in Figure 1, however, with the additional character a.

The main difference of the system in Figure 2 over that in Figure 1 consists in the provision of means for automatically reversing the ram and selectively causing the ram to perform a single cycle and then to stop or to perform an indefinite number of cycles. To this end, the upper portion of the press cylinder 1a is connected through a conduit 69 with a hydraulic tonnage control valve generally designated 70 which comprises a bore 71 having reciprocably mounted therein a plunger 72. The plunger 72 is continuously urged into the position shown in the drawing by means of a spring 73. The plunger 72 has connected thereto an extension member 74 including a plunger 75 with an annular groove 76 which latter is adapted in a predetermined position of the plunger 72 to establish connection between the conduits 77 and 78.

The conduit 77 leads to the conduit 69 while the conduit 78 leads into the lower portion of the control cylinder 23a. The plunger 75 is reciprocably mounted in a bore 79 which is connected through a conduit 80 with a valve casing 81 in which is reciprocably mounted a valve member 82. The valve member 82 is provided with two annular grooves 83 and 84 which are adapted in a predetermined position of the valve member 82 respectively to establish fluid connections between the conduits 85 and 86 and between the conduits 80 and 87. The conduits 86 and 87 are adapted respectively to communicate with conduits 88 and 89 through grooves 90 and 91 in the valve member 92 when the latter occupies the position shown in Figure 2.

The valve member 92 is respectively mounted in a bore 93 and is continuously urged outwardly by a spring 94. The valve member 92 is adapted to be actuated by a cam 95 adjustably mounted on the control rod 16a. The conduits 88 and 89 are respectively connected to relief valves generally designated 96 and 97. The relief valve 96 comprises a valve member 98 continuously urged into its closing position by a spring 99. The valve member 98 is adapted in response to a predetermined pressure acting thereupon to establish fluid connection between the conduit 88 and the conduit 100 which latter leads into the conduit 101. The conduit 101 is adapted in response to a predetermined pressure acting upon the valve member 102 to communicate with the conduit 89. The valve member 102 is continuously urged into its closing position by a spring 103.

Branching off from the conduit 101 is a conduit 104 comprising a check valve 105 and communicating with the conduit 106. One end of the conduit 106 leads into the upper portion of the control cylinder 23a while the other end of the conduit 106 leads to the valve casing 107. Reciprocably mounted in the valve casing 107 is a starter valve member 108 with two spaced annular grooves 109 and 110. These grooves are adapted in response to a predetermined position of the valve member 108 respectively to effect fluid connection between the conduits 106 and 111 and the conduits 112 and 113. A spring 114 in the valve casing 107 continuously urges the valve member 108 for preventing these said two fluid connections.

The system illustrated in Figure 2 operates as follows:

It may be assumed that all parts occupy the position shown in Figure 2 and that it is now desired to cause the ram 2a to perform an indefinite number of cycles. To this end, the operator preferably first starts the pump 5a, and then shifts the selector valve member 82 into such a position that the groove 83 establishes fluid connection between the conduits 85 and 86, while the groove 84 establishes fluid connection between the conduits 80 and 87. Thereupon, the back pressure in the cylinder 1a due to the weight of the ram and platen will be conveyed through conduits 115, 80, 87, 89 and 106 into the upper portion of the control cylinder 23a where it will act upon the plunger 22a to bring about clockwise movement of the lever 9a. Simultaneously, the other side of the piston 22a is exhausted through conduits 117, 88, 86, 85, 113, 101 and 43a to the tank 34a.

As a result thereof, the control rod 7a will be moved inwardly and the pump 5a moves into full delivery forward stroke position. Pressure fluid from the pump 5a now passes through conduit 4a into the upper portion of the cylinder 1a where it acts upon the ram 2a and moves the same downwardly, while fluid is withdrawn from the lower portion of the cylinder 1a through conduits 31a and 32a to the suction side of the pump 5a.

The ram 2a now moves downwardly by gravity as fast as fluid is withdrawn from the lower portion of the cylinder 1a. When the ram 2a and therefore also the press platen 3a moves downwardly, the control rod 16a likewise moves downwardly so that the cam 95 disengages the roller 116 connected to the valve member 92. Consequently, the spring 94 moves the valve member 92 into position for interrupting the fluid connection between the conduits 86 and 88 and also the fluid connection between the conduits 87 and 89.

As soon as the ram 2a moves downwardly, the operator releases the starter valve member 108 which is then returned by spring 114 into the position shown in Figure 2. The actual pressing stroke is now carried out by the ram 2a in the manner described above in connection with Figure 1.

When at the end of the pressing stroke a predetermined pressure has been built up in the upper portion of the press cylinder 1a, this pressure acts through conduit 69 on the valve member 72 in such a manner as to shift the latter against the thrust of the spring 73 toward the left, thereby moving the valve member 75 into such a position that the annular groove 76 interconnects the conduits 77 and 78. Consequently, the pressure prevailing in the conduit 69 is now conveyed through the groove 76 and the conduit 78 into the control cylinder 23a, beneath the control plunger 22a, where it acts upon the control plunger 22a and moves the latter upwardly.

The fluid expelled from the upper portion of the control cylinder 23a during the upward movement passes through conduits 106 and 89 into the relief valve 97 where it causes the valve member 102 to move downwardly against the thrust of the spring 103 so that the conduits 89 and 101 are interconnected. Therefore, the fluid expelled from the upper portion of the control cylinder 23a can now escape through conduit 101 into the tank 34a. The upward movement of the control plunger 22a brings about a movement of the lever 9a in anti-clockwise direction which results in an outward movement of the control rod 7a. The pump 5a is therefore moved into full delivery retraction stroke position.

Consequently, after fluid has been released from the upper portion of the press cylinder 1a through the main cylinder relief and pump by-pass valve 38a, the ram 2a begins its retraction stroke. The pressure conveyed through conduits 32a and 31a into the lower portion of the press cylinder 1a is also conveyed through conduits 115 and 80, into the cylinder 79 where it acts upon the valve member 75 and moves the latter toward the right if it should not already have moved toward the right due to the spring 73. The ram 2a now performs its retraction stroke.

When the ram 2a approaches the end of its retraction stroke, the platen arm 18a engages the collar 17a thereby lifting the rod 16a and causing the cam 95 to engage the roller 116 and thereby to move the valve member 92 into the position shown in the drawing. As soon as the valve member 92 reaches this position, it establishes fluid connection between the conduits 87 and 89 and also between the conduits 86 and 88. Consequently, the fluid pressure prevailing in the conduit 31a is conveyed through conduits 115 and 80, the annular groove 84, the conduit 87, the annular groove 91 and the conduits 89 and 106 into the upper portion of the control cylinder 23a. Here it acts upon the control plunger 22a and causes the same to move downwardly to thereby shift the lever 9a in clockwise direction and moving the pump 5a again into full delivery forward stroke position.

In this way, a new cycle has been initiated which is carried out in the same manner as described above. The fluid expelled from beneath the control plunger 22a during its downward movement passes through conduits 117, 88, 86, 85, 113 and 101 into the tank 34a.

If the press were set for semi-automatic operation instead of for full automatic operation, the valve member 82 would occupy the position shown in the drawing. If the valve member 82 is in this position, it will be clear that when the ram 2a reaches the end of its retraction stroke it cannot start a new cycle automatically since the fluid connection between the conduit 31a and the conduit 89 is interrupted.

If desired, the retraction stroke of the ram 2a may also be initiated manually by actuating the manual operable valve member 118. This valve member is reciprocably mounted in the bore 119 of a valve casing 120 which also houses a spring 121 continuously urging the valve member 118 into position for interrupting fluid connection between the conduits 122 and 123. When the valve member 118 is actuated so as to bring the annular groove 124 into alignment with the conduits 122 and 123, it effects fluid communication between these two conduits.

In this instance, fluid connection is also established between the lower portion and the upper portion of the control cylinder 23a so that the yielding means in the servomotor means 6a and the weight 52a will move the plunger 22a upwardly, thereby bringing about the initiation of the retraction stroke of the ram 2a in the manner described above.

Referring now to the embodiment shown in Figure 3, the latter likewise makes use of the principal shown in Figure 1, and similar parts are therefore designated with the same numerals as in Figure 1, however, with the additional character b.

The structure shown in Figure 3 differs from that of Figure 1 in that the control rod 16b is provided with a cam 125 which is adapted to actuate a roller 126 forming a part of a valve member 127. The valve member 127 is reciprocably mounted in a casing 128 and adapted in the position shown in the drawing to establish fluid connection between the conduits 129 and 130 through an annular groove 131 in the valve member 127. The platen 3b has furthermore connected thereto an arm carrying a cam 133 which is adapted to engage a roller 134 for actuating a valve member 135. The valve member 135 when moved toward the left by the cam 133 establishes fluid connection between the conduit 136 and the conduit 137. The valve member 135 is continuously urged outwardly by means of a spring 138.

Also connected to the platen 3b is a cam 139 adapted to cooperate with a valve member 140 which is reciprocably mounted in a valve casing 141. The left end of the valve casing 141 is connected through a conduit 142 with the conduit 43b, whereas the right hand end of the casing 141 is connected through a conduit 143 with the conduit 144. One end of the conduit 144 leads into the upper portion of the control cylinder 23b while the other end of the conduit 144 leads to one end of a hand pump generally designated 145. This pump comprises a cylinder 146 and a plunger 147 which is manually operable by means of a lever 148.

The upper portion of the press cylinder 1b is connected through a conduit 149 with a hydraulic tonnage control valve generally designated 150. This valve comprises a cylinder 151 with a bore 152 in which is reciprocably mounted a plunger 153. The plunger 153 is continuously urged into the position shown in Figure 3 by means of a spring 154 and is connected to a valve member 155 which is reciprocably mounted in a valve casing 156. The valve member 155 has an annular groove 157 adapted when the valve member 155 is in its left hand position to establish fluid connection between the conduits 158 and 159. The left hand end of the valve casing 156 is connected with a conduit 160 comprising a check valve 161 and leading to a conduit 162 with an adjustable choke 163.

The structure shown in Figure 3 operates as follows:

Provided that all parts of the system occupy the position shown in the drawing, and it is now desired to start an indefinite number of cycles of the press, the operator starts the pump 5b and shifts the selector valve member 170 into position for causing the groove 171 thereof to establish fluid connection between the conduit 130 and the conduit 172. As a result thereof, back pressure from the lower portion of the cylinder 1b passes through conduits 162, 129, groove 131, conduit 130, groove 171, conduit 172, and conduit 24b into the upper portion of the control cylinder 23b. Here the pressure fluid acts upon the plunger 22b and moves the same downwardly, thereby moving the lever 9b in clockwise direction.

As a result thereof, the control rod 7b is moved inwardly and the pump 5b is shifted into full delivery forward stroke position. Pressure fluid delivered by the pump 5b now passes into the upper portion of the cylinder 1b while fluid is withdrawn from the lower portion of the cylinder 1b through conduits 31b and 32b to the suction side of the pump 5b. Consequently, the ram 2b moves downwardly as fast as fluid is withdrawn from the lower portion of the cylinder 1b. The pressure fluid delivered by the pump 5b into the upper portion of the cylinder 1b is supplemented by fluid passing from the tank 34b through the surge valve 42b into the cylinder.

When the press platen 3b begins to move downwardly, the operator releases the valve member 27b, and the cam 125 releases the roller 126 so that the spring moves the valve member 131 outwardly thereby causing the latter to interrupt fluid connection between the conduits 129 and 130.

When the press platen 3b encounters resistance offered by the work piece, the surge valve 42b closes and the ram 2b is now moved downwardly by pressure fluid delivered by the pump 5b only. The press ram now performs its actual pressing stroke.

Due to the movement of the platen 3b, also the cam 139 connected to the platen 3b moves downwardly. During this downward movement of the ram 2b, the roller 166 of the valve member 140 is held in engagement with the cam 139 due to the fact that pressure is conveyed from the upper portion of the control cylinder 23b through the conduits 144 and 143 to the right side of the valve casing 141. After the ram 2b has moved downwardly such a distance that the roller 166 leaves the cam surface 167, the resistance encountered by the roller 166 and opposing the leftward movement of the valve member 140 decreases.

As a result thereof, the yielding means in the servomotor means 6b and the weight 52b are free to move the plunger 22b somewhat upwardly, thereby increasing the pressure acting through conduit 143 on the right side of the valve member 140 so that the roller 166 is moved into engagement with the cam surface 168. Due to the slight upward movement of the plunger 22b, the stroke of the pump 5b and therefore the delivery thereof is slightly reduced. This results in a slow down of the ram 2b.

When the roller 166 leaves the cam surface 168 a similar reduction in speed of the ram 2b will be brought about. If instead of slowing down the ram a second time it would be desired to speed it up again, it is merely necessary to replace the cam surface 169 with a cam surface which protrudes toward the right beyond the cam surface 168.

When at the end of the downward stroke of the ram 2b a predetermined pressure has built up acting on the ram 2b, this pressure is conveyed through conduit 149 to the tonnage control valve 150 where it shifts the valve member 153 toward the left so as to cause the valve member 155 to establish fluid connection between the conduits 158 and 159. Due to the establishment of this fluid connection, the lower and upper portions of the control cylinder 23b are interconnected, and inasmuch as the conduit 158 is connected through conduit 43b with the tank 34b, no pressure will prevail any more in the control cylinder 23b. Therefore, the yielding means in the servomotor means 6b, supported by the force of the weight 52b, causes the plunger 22b to move upwardly.

As a result thereof, the pump 5b moves into full delivery retraction stroke position. Hence, pressure fluid is now delivered by the pump 5b through conduits 32b and 31b into the lower portion of the cylinder 1b while the upper portion of the cylinder 1b will be connected through the surge valve 42b with the tank 34b. This last mentioned fact causes the pressure in conduit 149 to drop so that the spring 154 will return the tonnage control valve 150 and also the valve member 155 to the initial position. The press ram 2b then performs its retraction stroke in a manner similar to that described above in connection with Figure 2.

When the press ram approaches the end of its retraction stroke, the cam 125 engages the roller 126 and shifts the valve member 127 into the position shown in the drawing thereby establishing fluid connection between the conduits 129 and 130. Since, as previously mentioned, the selector switch occupies the position in which the groove 171 interconnects the conduits 130 and 172, pressure fluid from conduit 31b now flows through conduits 129, 130, 172 and 24b into the upper portion of the control cylinder 23b thereby causing downward movement of the plunger 22b and placing the pump 5b again in full delivery forward stroke position. This starts a new cycle of the press in the manner described above.

If it were desired to have the press perform a single cycle only and then to stop, it would merely be necessary to leave the selector switch member 170 in the position shown in the drawing. It will then be clear that the fluid connection between the conduit 31b and the conduit 24b is interrupted and that therefore the pump 5b will not automatically be shifted into full delivery forward stroke position when the ram 2b has reached the end of its retraction stroke.

If instead of pressure reversal, position reversal of the ram is desired, the cam 133 which is preferably mounted so that it can be made ineffective, is adjusted so that at a predetermined position of the ram 2b it will engage the roller 134 and thereby cause the valve member 135 to interconnect the conduits 136 and 137. Since the conduit 137 is connected through conduit 172 with the conduit 24b, the just described movement of the position reversal valve member 135 will have the same effect as the movement of the valve member 155 into the position for effecting fluid connection between the conduits 158 and 159.

The system shown in Figure 3 is also provided with a manually operable reversal switch generally designated 173 comprising a valve member 174 with a groove 175 adapted in a predetermined position of the valve member 174 to establish fluid connection between the conduit 172 and the conduit 176. When this fluid connection is established, it will bring about the same effect as the movement of the valve member 135 into position for interconnecting the conduits 136 and 137, since the groove 175 will then interconnect the conduits 24b and 43b.

The arrangement shown in Figure 3 comprises means for inching the ram 2b downwardly as may be necessary, for instance, in order to set the dies properly. These inching means are represented by the pump 145.

It may be assumed that all parts occupy the position shown in Figure 3, in which position the pump 5b occupies its neutral or substantially no delivery position. It may also be assumed that the pump 5b is running. In order to inch the ram 2b, the operator swings the lever 148 in clockwise direction thereby causing the plunger 147 to transfer fluid from the cylinder 146 into the upper portion of the control cylinder 23b. As a result thereof, the plunger 22b moves slightly downward, thereby placing the pump 5b on the restricted forward stroke. Consequently, the pump delivers fluid into the press cylinder 1b and causes the ram 2b to move downwardly.

When the ram 2b has advanced the desired distance, the operator releases the lever 148, whereupon the yielding means in the servomotor means 6b and the weight 52b return the control plunger 22b to its previous position so that the pump 5b is again moved towards neutral. The ram 2b then comes to a stop. The fluid expelled from the upper portion of the control cylinder 23b during the upward movement of the plunger 22b passes into the pump cylinder 146, thereby returning the pump plunger 147 to its initial position.

From the above, it will be seen that the present invention provides a completely hydraulic control system for controlling the operation of the press plunger, and has done away with electric control systems heretofore commonly used for the purpose involved.

It is, of course, understood that the present invention is by no means limited to the particular structure shown in the drawings, but also embraces any modifications as fall within the scope of the appended claims.

Having thus fully described my invention, what I claim as new and desire to secure by Letters Patent is:

1. In a fluid operable system, a double acting ram, a fluid source for supplying actuating fluid selectively to one or to the other surface of said ram, control means associated with said fluid source for controlling the delivery thereof to said ram, piston-cylinder means connected with said control means for actuating the same, valve means selectively operable for admitting fluid to said piston-cylinder means and for entrapping it therein, other valve means selectively operable for exhausting said piston-cylinder means, and means for controlling the speed of said ram comprising a variable chamber hydraulically connected with said piston-cylinder means and adjustable in volume in response to the movement of said ram.

2. In a hydraulic system, a double acting ram, a fluid source for supplying fluid selectively to one or to the other surface of said ram, control means for controlling the delivery from said source to said ram, means continuously urging said control means into position to bring about the delivery from said source to said one surface of said ram, a plunger connected with said control means and operable by fluid pressure to position said control means to bring about the delivery of said source to the said other surface of said ram, first valve means operable to admit actuating fluid to said plunger and for entrapping said fluid therein, other valve means operable to exhaust said plunger, and means for controlling the speed of said ram comprising a variable chamber hydraulically connected with said piston-cylinder means and adjustable in volume in response to the movement of said ram.

3. In a hydraulic system, a vertically reciprocable ram having an upper advancing area and a lower retracting area, a fluid source for selectively supplying fluid to said advancing or to said retracting areas, control means for controlling the delivery of said source to said areas, means continuously urging said control means into position to bring about the supply of fluid to said retracting area, a plunger connected with said control means, a cylinder within which said plunger is reciprocable, valve means operable hydraulically to connect said retracting means with said cylinder for admitting fluid thereto and for entrapping the same therein thereby to position said control means to bring about the delivery of fluid to said advancing means, means responsive to the advancing movement of said ram for varying the quantity of fluid entrapped in said cylinder thereby to vary the advancing speed of said ram comprising a chamber hydraulically connected with said cylinder, a piston reciprocable in said cylinder, and a cam carried by said ram engaging said piston, and means operable for exhausting said cylinder to bring about the supply of fluid to said retracting area to retract said ram.

4. In a hydraulic system, a vertically reciprocable ram having an upper advancing area and a lower retracting area, a fluid source of variable delivery for selectively supplying fluid to said advancing area or to said retracting area, servomotor means for controlling the direction and rate of delivery from said fluid source, means continuously urging said servomotor into position to bring about the delivery of fluid from said source to said retracting area, a plunger connected with said servomotor means, a cylinder within which said plunger is reciprocable, a first valve means selectively operable to connect said cylinder with said retracting area so as to admit fluid to the former from the latter and for entrapping the same therein, second valve means selectively operable for connecting said cylinder with exhaust, means automatically operable for varying the quantity of entrapped fluid in said cylinder in response to the advancing movement of said ram, and manually operable means for varying the quantity of fluid in said cylinder for advancing said ram through predetermined increments.

5. In a hydraulic system, a vertically reciprocable ram having an upper advancing area and a lower retracting area, a fluid source for selectively supplying fluid to said areas, control means associated with said source for controlling the direction and rate of delivery therefrom, means continuously urging said control means into position to bring about the delivery of fluid to said retracting area, piston-cylinder means connected with said control means and responsive to fluid pressure to bring about the delivery of fluid to said advancing means, first valve means operable to connect said piston-cylinder means with said retracting area in order to admit fluid to the former and for entrapping it therein, second valve means operable to exhaust said piston-cylinder means, and means for varying the quantity of fluid entrapped in said piston-cylinder means comprising first and second plungers hydraulically connected therewith and the first being reciprocable automatically in response to the movement of said ram and the second being reciprocable manually.

6. In a hydraulic system, a fluid motor having a first port and a second port, a fluid source connected with said ports, control means for controlling the rate and direction of delivery of said source to said ports, piston-cylinder means connected with said control means adapted for moving said control means into position to bring about the delivery to said first port, first valve means connected with said piston-cylinder means and operable to admit actuating fluid thereto and to entrap the same therein, second valve means selectively operable to exhaust said piston-cylinder means, third valve means operable in response to a predetermined pressure at said first port to exhaust said piston-cylinder means, means automatically operable in response to a predetermined movement of said motor to vary the quantity of entrapped fluid in said piston-cylinder means thereby to actuate said control means to vary the rate of movement of said motor, and manual means operable to vary the quantity of fluid in said piston-cylinder means for manually controlling the movement of said motor.

7. In a hydraulic system, a fluid motor having first and second ports, a fluid source connected with said ports, control means for controlling the rate and direction of delivery of said source to said ports and continuously urged to bring about the delivery to one of said ports, piston-cylinder means connected with said control means and responsive to fluid pressure for moving said control means into position to bring about the delivery to the other of said ports, manually operable valve means connected with said piston-cylinder means and operable to admit actuating fluid thereto and to entrap the same therein and to exhaust said piston-cylinder means, automatically operable valve means responsive to a predetermined movement of said motor for admitting actuating fluid to said piston-cylinder means and for entrapping it therein and for exhausting said piston-cylinder means, other valve means automatically operable in response to a predetermined pressure at said other port to exhaust said piston-cylinder means, a selector valve selectively positionable for making the automatic valve for admitting fluid to said piston-cylinder means either effective or ineffective, and means for varying the quantity of fluid entrapped in said piston-cylinder means for controlling the movements of said motor comprising first and second plungers hydraulically connected with said piston-cylinder means and the first thereof being reciprocable automatically in response to the movement of said motor and the second thereof being reciprocable at will manually.

8. In a fluid operable system, a movable member having fluid operable advancing and retracting means, a fluid source for supplying said advancing and retracting means, control means for controlling the delivery of fluid from said source to said means, fluid pressure responsive means connected with said control means for actuating the same, means selectively operable for admitting fluid to said fluid pressure responsive means and for entrapping it therein, means selectively operable for exhausting said fluid pressure responsive means, and means for controlling the speed of movement of said member comprising a variable chamber hydraulically connected with said fluid pressure responsive means and adjustable in volume in response to movements of said member.

JOHAN A. MULLER.

REFERENCES CITED

The following references are of record in the file of this patent:

UNITED STATES PATENTS

| Number | Name | Date |
| --- | --- | --- |
| 612,324 | Frazier | Oct. 11, 1898 |
| 1,595,755 | Brooks | Aug. 10, 1926 |
| 1,606,426 | Justen | Nov. 9, 1926 |
| 1,927,583 | Ernst | Sept. 19, 1933 |
| 2,057,258 | Wineman | Oct. 13, 1936 |
| 2,141,703 | Bays | Dec. 27, 1938 |
| 2,227,814 | Tyler | Jan. 7, 1941 |
| 2,240,011 | Casey | Apr. 29, 1941 |
| 2,253,617 | Griffith | Aug. 16, 1941 |
| 2,258,886 | Ernst | Oct. 14, 1941 |
| 2,295,813 | Tucker | Sept. 15, 1942 |
| 2,298,359 | Ernst | Oct. 13, 1942 |
| 2,316,471 | Tucker | Apr. 13, 1943 |
| 2,335,809 | Stacy | Nov. 30, 1943 |
| 2,367,241 | Stacy | Jan. 16, 1945 |